Jan. 30, 1940.   J. LEDWINKA   2,188,879
VEHICLE UNDERFRAME CONSTRUCTION
Original Filed Oct. 6, 1937   2 Sheets-Sheet 1
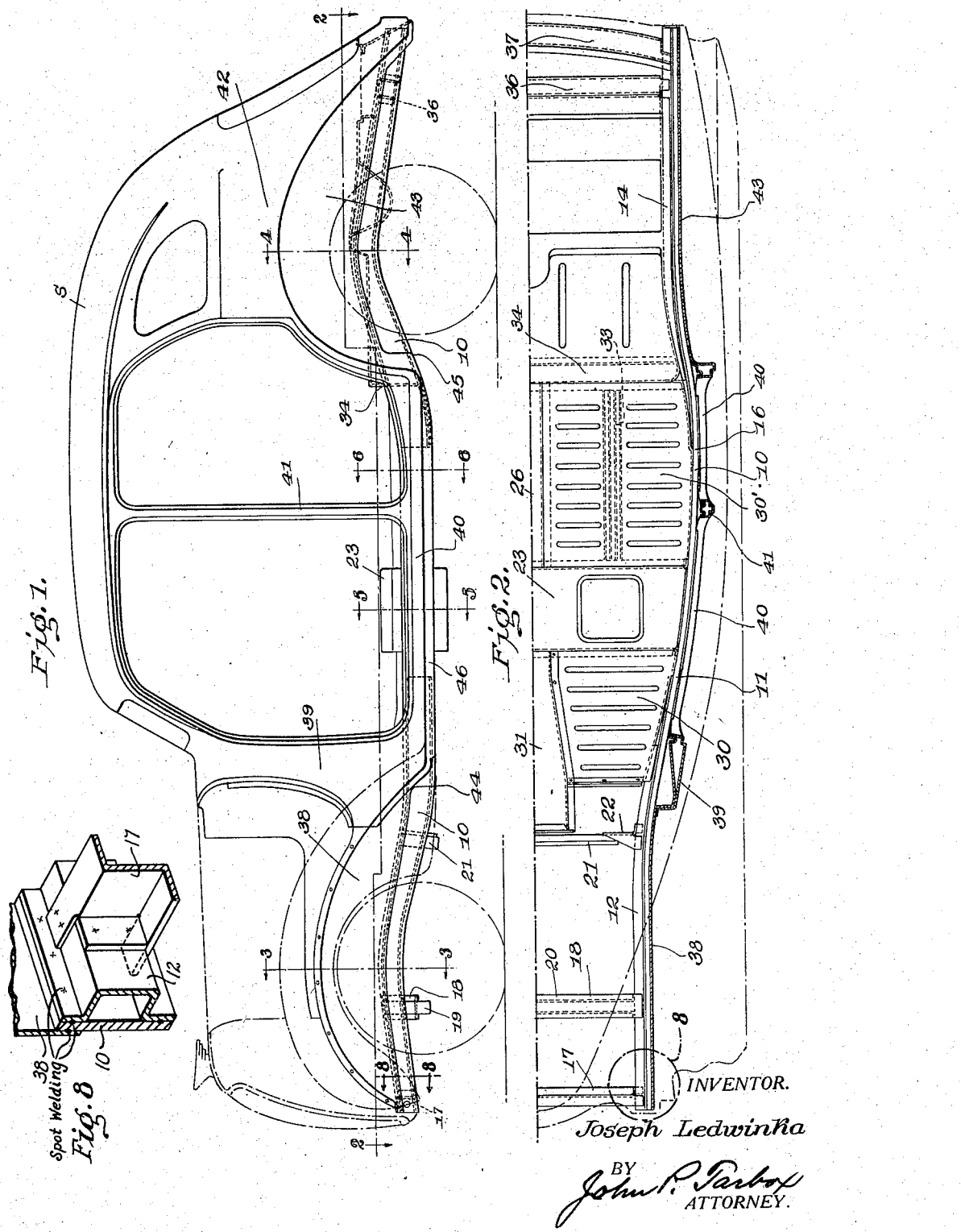
INVENTOR.
Joseph Ledwinka
BY
John P. Tarbox
ATTORNEY.

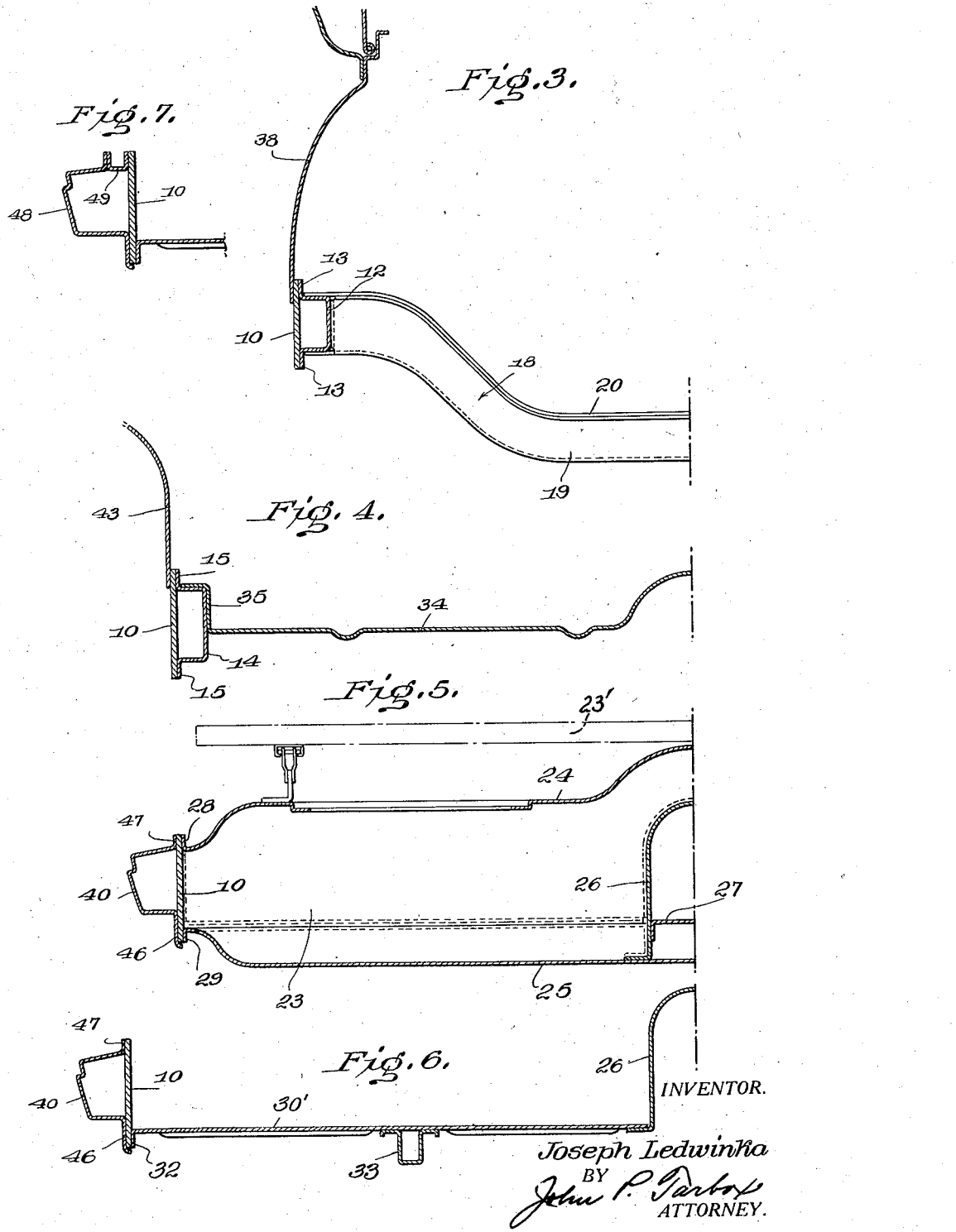

Patented Jan. 30, 1940

2,188,879

UNITED STATES PATENT OFFICE

2,188,879

VEHICLE UNDERFRAME CONSTRUCTION

Joseph Ledwinka, Philadelphia, Pa., assignor to Edward G. Budd Manufacturing Company, Philadelphia, Pa., a corporation of Pennsylvania Application October 6, 1937, Serial No. 167,528
Renewed October 10, 1939

8 Claims. (Cl. 280—106)

The invention relates to an underframe for automobile bodies and more particularly to such an underframe adapted to serve both as body underframe and as chassis.

It is an object of the invention to decrease the over-all weight of the combined body and chassis, to simplify the construction and fabrication of such structures, to facilitate their assembly, all without sacrifice of the necessary strength and with a saving in cost.

These objects are attained in large part by the use of main side sill members each extending from end to end of the vehicle and readily fabricated from flat strip stock and disposed substantially vertically in the completed structure. Such members can be readily bent in vertical and transverse directions to conform to the desired shape. They are preferably vertically of substantial depth and thus are very strong in shear and adapted to carry the load if stiffened to prevent twisting in the plane of the sheet. To stiffen them in this respect and to enable them to carry the loads to which they are subject, the rear and forward portions thereof are reinforced by outwardly presenting hollow, such as flanged channel, members which overlap the top and bottom margins of the web members and are rigidly secured thereto in the overlap, as by spot welding, thus forming therewith rigid box section structures. To continue this box section structure through the intermediate or central portions of said members use is made of the outer body paneling of the body superstructure which, particularly in the threshold regions, is of inwardly presenting hollow, such as flanged channel, section and secured to the outer face of the web member at top and bottom to form therewith similar rigid box section structures. The outer reinforcement so formed by the body superstructure and the end reinforcements overlap longitudinally to a considerable extent, thus in effect providing a box section sill structure extending from end to end of the vehicle which is highly resistant to torsion and thus maintains said main members in a substantially verticle plane, their most efficient disposition for carrying the loads.

These main box section side sill structures are tied together by transverse members and sheet metal flooring to further stiffen and strengthen the underframe structure. The construction so described facilitates the fabrication and joinder of the parts by simple spot welding operations.

Other and further objects and advantages and the manner in which they are attained will become apparent from the following detailed description when read in connection with the accompanying drawings in which:

Figure 1 is a side elevational view of a vehicle body embodying the invention.

Figure 2 is a sectional plan view of the left-hand half of the structure, the section being taken approximately along the line 2—2 of Figure 1 and the plan projection outline of the body superstructure being indicated in dot and dash lines.

Figures 3, 4, 5 and 6 are detail transverse sectional views on an enlarged scale of the left-hand half of the structure, the sections being taken respectively along the lines 3—3, 4—4, 5—5 and 6—6 of Figure 1.

Figure 7 is a detail sectional view taken approximately on the line 6—6 of Figure 1 showing a slight modification.

Figure 8 is a perspective view showing a section through the side sill along the line 8—8 of Fig. 1 and showing the parts enclosed by the circle numbered 8 of Fig. 2.

As shown in the drawings, the main vertically deep flat web members of the combined body and chassis are indicated by the reference character 10. As appears from Figures 1 and 2 they extend from end to end of the vehicle structure. From their front ends inwardly to a point approximately indicated by the numeral 11 located in the front portion of the threshold region of the body superstructure, indicated generally by the reference character S, each of the web members 10, which are preferably of considerably heavier gauge, as shown, than the members associated therewith, are stiffened and reinforced by flanged channel members 12. The flanges 13 of these channel members 12 overlap, respectively, the top and bottom marginal portions of the web member 10 and are securely spot welded thereto to form a rigid box section structure. Toward their inner or rear ends the channel members 12 decrease in depth as indicated in Figure 2 until they merge at the point 11 substantially flatly into the inner face of the web 10.

Similar members as 14 having edge flanges 15 extend inwardly from the rear ends of the web members 10 and form box section structures therewith in the same manner as the front members 12. The rear members terminate at the front in the rear portion of the threshold region of the body superstructure at a point indicated by the reference character 16 and merge into the web member 10 at said point in the same manner as the rear ends of the front members 12.

With the side sills so constituted, of the members 10, 12 and 14, the various cross brace members and the body flooring panels are assembled to strongly tie them together and interbrace them against twisting and other strains. These cross members and flooring panels may be widely varied and those shown herein are merely exemplary of the construction which has proved very satisfactory practice. These cross members and flooring and their connection to the sills are now to be briefly described.

Referring to Figures 1, 2 and 8, the front cross member 17 is shown as comprising a simple Z member having its vertical web flanged at the ends and secured to the bottom walls of the channels 12, while its top and bottom arms are extended to overlap the top and bottom side walls of the channels 12 and secured thereto.

The member 18 arranged just forwardly of the front axle and adapted to support the front of the motor, as shown in Figures 1, 2 and 3, is a box section member deflected downwardly in its central portion. It is formed of an upwardly facing flanged channel 19 closed by cover plate 20. At its ends the side walls of the channel are laterally flanged and secured to the bottom wall of the channel 12 while the plate 20 and the bottom wall of the channel 19 are extended to overlap and be secured respectively to the top and bottom side walls of the channels 12.

The cross member 21 supporting the rear of the engine and transmission may be, as shown in Figures 1 and 2, an angular member secured by brackets 22 to the three walls of the channels 12.

In the region of the front seat a vertically deep box section cross member 23 is provided, this box section member forming the seat support and also the housing for the battery and other accessories. It may be formed by an upper deep flanged channel member 24 as shown in Figure 5 and a lower shallow flanged member 25, the flanges of these channels being secured together in their margins at substantially the level of their body flooring. As shown in Figure 5 the central portion of the cross member is upwardly deflected and receives in its lower portion the downwardly facing flanged channel 26 forming the propeller shaft receiving tunnel. The lower part 23' of the seat proper is indicated schematically by dotted lines in Fig. 5.

Only one side of this tunnel is shown in the drawings, it being understood that the opposite side is symmetrical therewith. The channels 24 and 25 where their side walls intersect the tunnel 26 are flanged laterally and secured thereto. The side walls of the tunnel may be tied together in this region by the extension of the bottom wall of the channel 25 across the mouth of the tunnel and by an additional cross brace indicated at 27. The cross member 23 is rigidly secured to the web members 10 at its ends through the lateral flanges 28 and 29 formed respectively on the channels 24 and 25, see Figure 5.

Forwardly of the cross member 23, as shown in Figure 2, sheet metal flooring 30 interconnects the sills 10, 12, the lateral flanges on the cross member 23 and a lateral flange on the forward extension 31 of the tunnel 26. Rearwardly of the cross member 23 flooring panel 30' interconnects the side sills, cross member 23 and the tunnel 27 as clearly shown in Figure 6, the flooring paneling being flanged in its side margins at 32 and secured to the bottom margin of the sill. It may be provided with a longitudinal reinforcement as 33. In the region of the D-post the flooring panel is formed of the seat riser 34, see Figure 1, and extends rearwardly thereof to form the seat support. In this region the floor panel is of irregular conformation to receive various parts usually associated with the chassis and is secured in its sides as shown in Figure 4 through an angular conformation 35 to the sides and top of the channels 14.

A downwardly facing channel cross member 36, as shown in Figures 1 and 2, interconnects the rear end of the floor panel and the side sills. At the extreme rear end the side sills are connected by an angular cross member 37.

So constituted, the underframe may have all or substantially all the parts usually associated with a chassis assembled therewith, this assembly being effected on the usual chassis line. The body superstructure may be assembled on a separate line.

As shown, the body superstructure is a sheet metal structure having its side wall constituted by a front wheel housing portion 38, cowl portion 39, the threshold portion 40, the B—C post portion 41, the tonneau portion 42 including the rear wheel housing portion 43. The side walls so constituted are joined together in the usual manner by a rear wall panel, a roof panel and a cowl top panel.

This body superstructure subassembly may be brought down over the chassis subassembly as above described to complete the chassis body assembly and to further reinforce the underframe. In this final assembly the wheel housing portions 38 and 43 overlap the top marginal portion of the reinforced web 10 as shown in Figures 3 and 4 and are spot welded thereto. From the cowl region at the point indicated by the numeral 44 rearwardly through the threshold region to a point indicated at 45 rearwardly of the D-post the body side panel overlaps the web 10 for its full depth and is secured through a marginal flange 46 to the bottom marginal portion of the web 10. The threshold portion is of inwardly presenting flanged channel section as shown in Figures 5 and 6 and secured through its bottom flange 46 and its top flange 47 with the web 10 to form a box section structure throughout the threshold region. By reference to Figure 2, it will be seen that this outer box section longitudinally overlaps the inner box sections formed by the reinforcements 12 and 13 extending inwardly from the ends and very materially reinforces the web member 10 throughout its intermediate or central region.

In Figure 7 is shown a slight modification of the threshold structure. Such a structure is provided to avoid the difficulties of draw where the threshold section is required to be very deep to provide the desired body contour. In such case, the top side wall of the channel threshold portion indicated by the numeral 48 is terminated short of the web 10 and is secured to it by a channel spacer 49 spot welded to both the flanged margin of the threshold portion 48 and the top margin of the web 10. The width of this channel spacer 49 may vary in different parts of the threshold and in different bodies to suit the requirements of the contour desired.

While I have herein described a specific embodiment of the invention, it will be understood that changes and modifications may be made without departing from the spirit and scope of the invention as expressed in the appended claims and such changes and modifications are intended to be covered thereby.

What I claim is:

1. A combined body and chassis side sill comprising a flat vertical web extending from end to end of the chassis and conforming in plan to the contour of the lower margin of the body side wall, hollow outwardly presenting reinforcements secured to said web in the end regions thereof to form box section structures therewith, said reinforcements being separated from each other in an intermediate region, a body side wall having a threshold portion of inwardly presenting hollow section overlapping the outer face of the intermediate portion of said web and secured thereto to form a box section structure therewith.

2. A combined body and chassis side sill having as a main element thereof a continuous vertical web bent to conform to the lower side margin of the body, in combination with inner outwardly facing hollow section reinforcements adjacent the ends of said web, said reinforcements being separated from each other in an intermediate region, and an outer inwardly facing hollow section reinforcement intermediate the ends of said web, said hollow section reinforcements combining with the web to form in effect a continuous box section sill structure from end to end of the chassis.

3. A combined body and chassis side sill comprising a flat vertical web extending from end to end of the chassis and bent in plan view to the desired curvature of the lower margin of the body side wall associated therewith, outwardly facing channel reinforcements secured to the inner face of said web and extending inwardly from each end thereof a substantial distance, said reinforcements being separate from each other in an intermediate region, and a body superstructure having hollow inwardly presenting channel threshold portions overlapping the intermediate portions of said webs on the outer face thereof and forming with said web and the inner end reinforcements thereof, a continuous box section sill from end to end thereof.

4. A combined body and chassis side sill comprising a flat vertical web extending from end to end of the chassis and bent in plan view to the desired curvature of the lower margin of the body side wall, outwardly facing flanged channel reinforcements secured to the inner face of the web at the opposite ends thereof to form box section structures therewith, said reinforcements being separated from each other in an intermediate region, a body superstructure having a hollow inwardly presenting threshold portion in its side wall overlapping the intermediate portions of said web and forming a box section therewith, the end and intermediate box section structures overlapping at their adjacent ends to form in effect a continuous box section sill structure extending from end to end of the chassis.

5. A combined body and chassis side sill for vehicles comprising as a main element thereof a vertical web extending from end to end of the chassis and conforming to the lower margin of the body side wall in combination with flanged channel reinforcements applied to the inner face of the end portions of said web and secured thereto to form box section structures therewith, said reinforcements being separated from each other in an intermediate region, and inwardly facing flanged channel threshold portions overlapping the outer face of the intermediate portion of said web and forming a box section structure therewith, said web being of heavier gauge than the channel reinforcements associated therewith.

6. A vehicle underframe comprising side sills, each comprised initially of a main vertical web member and hollow section reinforcements applied to the inner face of said web member and secured thereto to constitute with said web member box section structures extending from the ends thereof into the threshold region but being separated from each other for a part of the length of said threshold region, in combination with a body superstructure having inwardly facing hollow threshold portions arranged to be brought in final assembly in overlapping and secured relation to the intermediate region of the outer faces of said web members to form box section structures therewith, thus in effect continuing the box sections from end to end of the sills.

7. In a sill structure, a member extending in the longitudinal direction of said sill structure and comprising a web, a hollow section reinforcement applied to one side of said web and coextensive with a part of its length only, a second hollow section reinforcement applied to the opposite side of said web and having one of its end portions overlapping a portion of the length of said web to which an end portion of said first named reinforcement is fastened whereas the remaining part of said second reinforcement extends over an adjacent portion of said web, said member comprising the web and said reinforcements forming in effect a continuous box section sill structure, the depth vertical to said web of one of said reinforcements decreasing toward its end which overlaps the end portion of the other reinforcement.

8. In a sill structure, a member extending in the longitudinal direction of said sill structure and comprising a web, a hollow section reinforcement applied to one side of said web and coextensive with a part of its length only, a second hollow section reinforcement applied to the opposite side of said web and having one of its end portions overlapping a portion of the length of said web to which an end portion of said first named reinforcement is fastened whereas the remaining part of said second reinforcement extends over an adjacent portion of said web, the arrangement of said reinforcements on different sides of said web and coextensive with different portions of the length thereof together with the overlapping relationship of one end each of the reinforcements providing in effect for a continuous box section sill structure which is relatively sharply offset in the region where the two reinforcements overlap each other without the use of a correspondingly sharply offset web and reinforcement.

JOSEPH LEDWINKA.